Patented Sept. 8, 1942

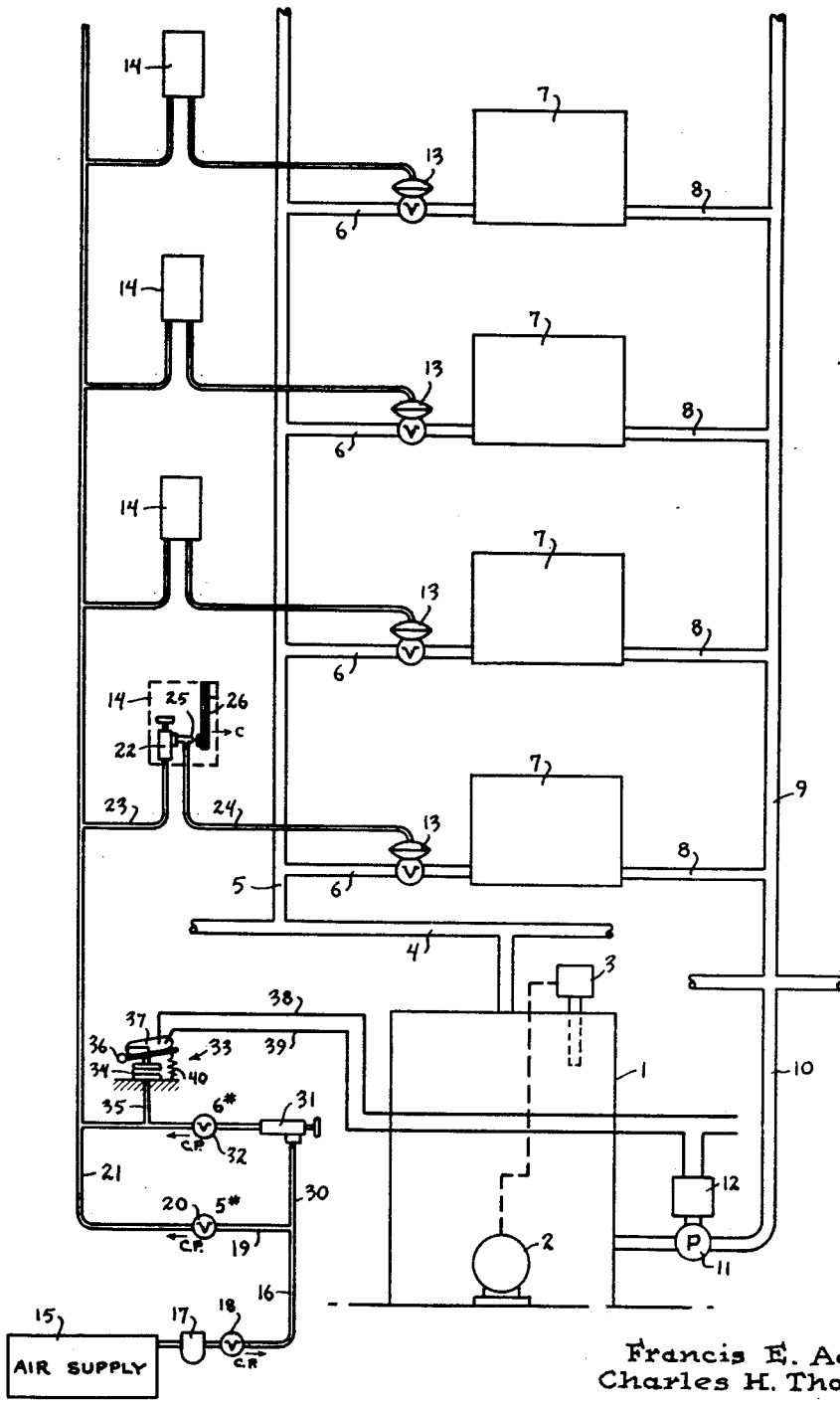

2,295,149

UNITED STATES PATENT OFFICE 2,295,149

CONTROL APPARATUS

Francis E. Adams, Portland, Oreg., and Charles H. Thompson, Huntington Valley, Pa., assignors to Minneapolis-Honeywell Regulator Company, Minneapolis, Minn., a corporation of Delaware Application August 10, 1939, Serial No. 289,418

9 Claims. (Cl. 236—1)

This invention relates in general to automatic controls and more particularly to fluid actuated control systems utilizing air or other medium at a pressure different from atmosphere for actuating the controlling devices.

In many control installations, it is desirable to control a plurality of control devices in a predetermined relationship or sequence so that one control device is caused to operate when one or a plurality of control devices operate. For example, in the heating system art, it is often desired to provide a thermostat in each room for controlling a radiator valve, and to cause the burner or circulator to be placed into operation whenever any one radiator valve is open while causing the burner or circulator to stop whenever all of the radiator valves are closed. Also, in controlling of industrial processes, this same general type of control is desirable in many instances for causing actuation of a certain controller or controllers in response to actuation of another or other controllers.

It is an object of this invention to provide an automatic control arrangement in which one or more fluid actuated motor devices are controlled by suitable controllers and in which one or more other control devices are controlled in a predetermined sequence therewith.

A further object is the provision of a fluid actuated control system in which the flow of fluid through a conduit is varied by a first controller or controllers and in which a second controller is actuated in accordance with the flow of fluid through the conduit.

Another object of this invention is the provision of a simple arrangement for detecting the actuation of a fluid actuated motor device by its controller which functions by detecting the resulting change in flow of actuating fluid for the motor device.

Other objects will become apparent from the following description and the appended claims.

For a full disclosure of this invention, reference is made to the following detailed description and to the accompanying drawing, the single figure of which illustrates diagrammatically the application of the invention for controlling a heating system.

Referring to the drawing, the heating system to which the invention is applied may consist of a boiler 1 having a burner 2 controlled by means of a thermostat 3 which responds to the temperature of the heated water and which controls the burner in a manner to maintain this temperature constant. This boiler 1 is connected to a supply main 4 which leads to a plurality of risers including the riser 5. This riser is connected by pipes 6 to the radiators 7 which in turn are connected by return pipes 8 to a return riser 9, this return riser in turn being connected to a return main 10 leading back to the boiler. This return main includes a circulating pump 11 which is driven by means of an electric motor 12. This circulating device acts to force circulation of water from the boiler through the radiators and back to the boiler. Each radiator 7 is controlled by means of a direct acting pneumatic valve 13, each of these valves being controlled by corresponding room thermostats 14 which respond to the temperature of the rooms heated by the corresponding radiators.

Referring to the pneumatic control system, reference character 15 indicates an air supply tank which may store a supply of air under relatively high pressure such as 40 pounds per square inch. This tank is connected to an air supply line 16 which includes a filter 17 and a pressure reducing valve 18. This pressure reducing valve may be set so as to maintain a relatively low pressure in line 16 such as 15 pounds per square inch. The line 16 is connected to a line 19 which is connected to a pressure reducing valve 20. This pressure reducing valve may be set so as to maintain a pressure of 5 pounds per square inch in the air supply main 21 which supplies air to all of the thermostats 14.

The thermostats 14 are of the direct acting type as well known in the art, and one is diagrammatically illustrated as including a restriction 22 which is connected to the air supply main 21 by line 23. The outlet of this restriction is connected by a line 24 to the valve 13 which the thermostat controls. Each thermostat also includes a bleed port 25 which is controlled by means of a thermostatic element 26. This thermostatic element 26 warps to the right when the space temperature falls and when the space temperature is below the setting of the thermostat permits a maximum flow of air through the bleed port 25. The restriction 22 is set so as to restrict the flow of air below the capacity of the bleed port 25 so that when the bleed port 25 is wide open, zero pressure will exist in the line 24 and in the diaphragm chamber of the pressure actuated valve 13. As mentioned before, the valve 13 is of the direct acting type which acts to open as the pressure applied thereto is decreased. Consequently, when the space temperature is below the setting of the thermostat 14, the valve 13 will be wide open for permitting a maximum flow of water through the corresponding radiator 7. However, as the space temperature increases the bimetallic element 26 will warp to the left for decreasing the flow of air through the bleed port 25 thereby increasing the pressure applied to the valve 13 for causing this valve partially to close. When the space temperature rises above the setting of the thermostat 14, the bleed port 25 will be completely closed thereby causing full supply line pressure to be applied to the valve 13 for causing this valve to be completely closed.

From the description thus far it will be apparent that each thermostat 14 controls its corresponding valve 13 in a manner to maintain the temperature in each room constant. It will also be seen that whenever all of the valves 13 are closed, all of the bleed ports 25 must be closed for achieving this result and therefore at this time there will be no flow of air through the air supply main 21. However, when any thermostat 14 calls for opening of its corresponding valve 13, it must open its bleed port 25 which results in flow of air through the air supply main 21.

In this type of heating system, it is undesirable to operate the circulating device whenever all of the valves are closed as this causes power to be consumed for no useful purpose. However, when any valve is opened it is necessary to operate the circulator in order to cause a circulation of water through the radiator required to be heated.

In order to control the circulator in this manner, a by-pass 30 is provided around the pressure reducing valve 20. This by-pass 30 includes a restriction 31, a pressure reducing valve 32, and a pressure responsive controller 33. This pressure responsive controller may be of usual form consisting of a bellows 34 which is connected to the by-pass 30 at the discharge side of reducing valve 32 by line 35. This bellows actuates a mercury switch carrier 36 which carries a mercury switch 37. This mercury switch is connected by wires 38 and 39 into the power circuit for the circulator motor 12 and thus controls this motor. The pressure responsive device 33 also includes a biasing spring 40 and this spring may be adjusted so that whenever the pressure in the air supply main 21 is at six pounds per square inch the switch 37 is tilted to open position for preventing operation of the circulator motor 12. However, when the pressure in the main 21 falls to five pounds per square inch this mercury switch will be tilted to closed position for thereby placing the circulator in operation.

The pressure reducing valve 32 is adjusted so as to maintain a pressure of six pounds per square inch at its outlet side. The restriction 31 is adjusted so that it restricts the flow of air through the by-pass 30 to a point which is below the capacity of any one bleed port 25 of the thermostats 14. By this arrangement when all of the thermostats 14 are satisfied and cause their valves 13 to close, there will be no flow of air through the air supply main 21. At this time, air will flow through the restriction 31 and the pressure reducing valve 32 and thereby build up a pressure of six pounds per square inch in the air supply main 21. This will cause the pressure responsive device 33 to open its mercury switch 37 thus placing the circulator 11—12 out of operation. However, when any thermostat calls for heat, its bleed port will open thereby bleeding air from the supply main 21. This rate of bleed will be greater than the capacity of the restriction 31 and consequently the air pressure in the supply main 21 will fall to the setting of the pressure reducing valve 20. This lowering of the air supply pressure will cause closing of the mercury switch 37 of the controller 33 thereby placing the circulator into operation.

From the foregoing description, it will be apparent that the present invention provides for controlling a secondary control device such as the circulator switch by detecting the flow of air through the air supply main to the group of primary control devices. While we have shown a preferred form of the invention, it will be apparent that many changes can be made without departing from the scope of the invention. For example, if desired the pressure reducing valve 32 may be omitted thus permitting the pressure in the main 21 to rise to a value equal to that in the pipe 16 whenever all of the bleed ports are closed. Also while it is preferable to utilize the flow detecting arrangement which changes the pressure of air in the entire supply main upon change in flow of air through the main where the flow to be detected is small, it may be desirable in certain applications of the invention to merely utilize a device such as a differential controller which responds to flow of air through the main.

While in most cases it will be necessary to control only one auxiliary device, it may be desirable in certain applications of the invention to control a plurality of auxiliary devices in sequence. For example, referring to the heating system illustrated it may be desirable to provide a plurality of circulators and to vary the number of circulators in operation depending upon the average opening of the valves 13. This can readily be done by providing additional by-passes such as 30 and additional controllers for controlling the additional circulators. It will be apparent that as many additional by-passes may be provided as desired.

While for purposes of description this invention has been described as applied to the control of a heating system, it will be apparent that the control system of this invention is of broader application. Also while for purposes of description certain values of pressure have been mentioned, it will be understood that these values may be varied as desired for different applications and installations of the invention. Inasmuch as the apparatus may be modified in many ways without departing from the scope thereof, we desired to be limited only by the scope of the appended claims.

We claim as our invention:

1. In a system of the class described, in combination, a fluid actuated motor, a source of fluid for actuating said motor, conduit means for connecting said motor and said source, means including a restriction and control valve means associated with said conduit means for varying the fluid pressure applied to said fluid actuated motor by varying the flow of fluid through said conduit means, a normally operative device for supplying a medium which is under the control of said motor, said device being adapted to be rendered inoperative when said motor is moved to a predetermined position, and means responsive to flow of fluid through said conduit means for controlling said device.

2. In a system of the class described, in combination, valve means, a fluid actuated motor for positioning said valve means, a source of fluid for actuating said motor, conduit means for connecting said motor and said source, means including control valve means associated with said conduit means and dividing said conduit means into a first portion and a second portion, said control valve means, controlling the pressure in the second portion by varying the flow through said first portion, means for varying the pressure in said entire first portion in response to flow of fluid therethrough, a device for supplying a condition changing substance under pressure to said valve means, and means responsive to the pressure in said first portion for controlling said device.

3. In a system of the class described, in combination, a plurality of valve means, a plurality of pressure actuated motors for positioning said valve means, a source of fluid for actuating said motors, conduit means including a common portion and a branched portion for connecting said source to said motors, an individual controller for each of said motors, said controllers being located in the branches of the branched portion of said conduit means and varying the pressure applied to their corresponding motors by varying the flow of fluid through said common portion, a device for supplying a condition changing substance under pressure to said valve means, and means influenced by the flow of fluid through said common portion for controlling said device.

4. In a system of the class described, in combination, conduit means for circulating fluid to a plurality of zones, power operated means for circulating said fluid, a flow controller for controlling the flow of fluid in each zone, a plurality of separate pneumatic control systems for independently controlling said flow controllers, a common air supply line for said pneumatic control systems, each of said pneumatic control systems comprising a pressure responsive device for controlling its corresponding flow controller, a restrictor having its inlet connected to the supply line, a branch line connected between the outlet of said restrictor and the pressure responsive device, and condition responsive valve means for bleeding air from the branch line for thereby varying the position of the corresponding flow controller, and means responsive to flow of air in said common air supply line for operating said power operated means.

5. In a heating system, in combination, a plurality of zones the temperatures of which are to be individually controlled, means for introducing heat to each zone, fluid actuated motors for controlling each of said heat introducing means, a source of fluid for actuating said motors, conduit means for connecting said motors and said source, a plurality of restrictions in said conduit means, thermostatically actuated control valve means associated with said conduit means at points intermediate said restrictions and said motors for varying the fluid pressures applied to said fluid actuated motors by varying the flow of fluid through said conduit means, a source of heating medium connected to said heat introducing means, a device for causing flow of heating medium from said heat source to said heat introducing means, and means responsive to flow of fluid through said conduit means at a point intermediate said restriction and said fluid source for controlling said device.

6. In a heating system, in combination, a plurality of zones the temperatures of which are to be individually controlled, means for introducing heat to each zone, fluid actuated motors for controlling each of said heat introducing means, a source of fluid for actuating said motors, conduit means for connecting said motors and said source, means including restrictions and control valve means associated with said conduit means for varying the fluid pressure applied to said fluid actuated motors by varying the flow of fluid through said conduit means, a source of heating medium connected to said heat introducing means, a device for causing flow of heating medium from said heat source to said heat introducing means, and means responsive to flow of fluid through said conduit means for controlling said device.

7. In a system of the class described, in combination, a plurality of zones the temperatures of which are to be individually controlled, means for changing the temperatures of each of said zones, fluid actuated motors for controlling each of said temperature changing means, a source of fluid for actuating said motors, conduit means for connecting said motors and said source, a plurality of restrictions in said conduit means, thermostatically actuated control valve means associated with said conduit means at points intermediate said restrictions and said motors for varying the fluid pressures applied to said fluid actuated motors by varying the flow of fluid through said conduit means, a source of temperature changing medium connected to said temperature changing means, a device for causing flow of temperature changing medium from said source of temperature changing medium to said temperature changing means, and means responsive to flow of fluid through said conduit means at a point intermediate said restriction and said fluid source for controlling said device.

8. In a heating system, in combination, a plurality of zones the temperatures of which are to be individually controlled, a radiator in each zone, fluid actuated motors for controlling each radiator, a first source of fluid at a predetermined pressure for actuating said motors, a second source of fluid at a predetermined higher pressure, conduit means for connecting both of said fluid sources and said motors, a plurality of restrictions in said conduit means, thermostatically actuated control valve means associated with said conduit means at points intermediate said restrictions and said motors for varying the fluid pressures applied to said motors and stopping the flow of fluid as the zone temperature reaches the desired value, means for limiting the flow of fluid from said second source so that the pressure in said conduit means is at the pressure of said first source when any of said control valve means is open, a source of heating medium connected to said radiators, a device for causing flow of heating medium from said heat source to said radiators, and means for causing operation of said device when the pressure in said conduit means is at the pressure of said first fluid source and for stopping operation of said device when the pressure in said conduit means is at the pressure of said second fluid source.

9. In a system of the class described, in combination, a plurality of zones the temperatures of which are to be individually controlled, means for changing the temperatures of each of said zones, fluid actuated motors for controlling each of said temperature changing means, a first source of fluid at a predetermined pressure for actuating said motors, a second source of fluid at a predetermined higher pressure, conduit means for connecting both of said fluid sources and said motors, a plurality of restrictions in said conduit means, thermostatically actuated control valve means associated with said conduit means at points intermediate said restrictions and said motors for varying the fluid pressures applied to said motors and stopping the flow of fluid as the zone temperature reaches the desired value, means for limiting the flow of fluid from said second source so that the pressure in said conduit means is at the pressure of said first source when any of said control valve means is open, a source of temperature changing medium connected to said temperature changing means, a device for causing flow of temperature changing medium from said source of temperature changing medium to said temperature changing means, and means for causing operation of said device when the pressure in said conduit means is at the pressure of said first fluid source and for stopping operation of said device when the pressure in said conduit means is at the pressure of said second fluid source.

FRANCIS E. ADAMS.
CHARLES H. THOMPSON.